Dec. 17, 1968  A. H. ADAMS ET AL  3,416,517
AUTOMATIC SHAMPOO APPARATUS
Filed Dec. 2, 1965  8 Sheets-Sheet 1

INVENTORS.
ARTHUR H ADAMS
MARY BOZOCOS, DECEASED,
BY HELEN BOZOCOS McKINNEY,
THALIA BOZOCOS FASANO AND
ALEXANDER BOZOCOS, HEIRS.

BY *Albert J. Fihe*

ATTORNEY

INVENTORS.
ARTHUR H. ADAMS
MARY BOZOCOS, DECEASED,
BY HELEN BOZOCOS McKINNEY,
THALIA BOZOCOS FASANO AND
ALEXANDER BOZOCOS, HEIRS.

ATTORNEY

Dec. 17, 1968  A. H. ADAMS ET AL  3,416,517
AUTOMATIC SHAMPOO APPARATUS
Filed Dec. 2, 1965  8 Sheets-Sheet 7

Fig. 9.

DRAIN

INVENTORS.
ARTHUR H. ADAMS
MARY BOZOCOS, DECEASED,
BY HELEN BOZOCOS McKINNEY,
THALIA BOZOCOS FASANO AND
ALEXANDER BOZOCOS, HEIRS.

BY *Albert J. Fihe*

ATTORNEY

United States Patent Office 3,416,517
Patented Dec. 17, 1968

3,416,517
AUTOMATIC SHAMPOO APPARATUS
Arthur H. Adams, Hollywood, Calif. (608 S. Hill St., Los Angeles, Calif. 90014), by Z. Harry, Astor, executor of said Arthur H. Adams, deceased, and Mary Bozocos, deceased, late of Los Angeles, Calif., by Helen Bozocos McKinney, Los Angeles, and Thalia Bozocos Fasano, Hayward, Calif., heirs, and Alexander Bozocos, Los Angeles, Calif., heir, by Helen McKinney, attorney-in-fact
Substituted for abandoned application Ser. No. 692,761, Oct. 28, 1957. This application Dec. 2, 1965, Ser. No. 515,292
21 Claims. (Cl. 128—65)

ABSTRACT OF THE DISCLOSURE

Apparatus including a fluid tight helmet for the head of a user, with a motor driven scrubber inside the helmet, and further including a user operated control for regulating the scrubber motor speed. Also included are fluid actuated means controllable by the user for regulating the pressure of the scrubber upon the user's head. The scrubber is provided with openings through which fluid is applied to the user's head. A supply cabinet automatically supplies water and hair treating fluid to the helmet. Separate solenoid actuated valves control the flow of water and hair treating fluid from the supply cabinet to the helmet. A hydraulic cylinder and piston in the cabinet is used to move a rod having means for successively engaging the solenoid control switches as the piston moves lengthwise of the cylinder.

This invention relates to an improved automatic shampooing apparatus and has for one of its principal objects the provision of a novel mechanical unit designed and constructed for the purpose of cleaning, massaging and adding cream or oil to the human head and hair.

One of the important objects of this invention is the provision of a device of the class described which will automatically wet, soap, rub, rinse, soap, cream or oil and then finally rinse to complete a cycle which will result in a satisfactory operation far superior and necessitating less time than previously done manually.

Another important object of the invention is to provide in an automatic shampooing and hair cleaning apparatus, a mixture control valve which will automatically provide the proper temperature of wash water regardless of line pressure drops in either cold or hot water inlets.

Another object resides in a device incorporated into the apparatus which will control the speed of the operative cycles at the option of the user.

A further object is the provision of soap, cream and oil containers which automatically control the output of ingredients therefrom to a predetermined amount during the cycle of operation.

A still further important object of the invention is to provide solenoids or similar valves which automatically control the passage of the various fluids in proper cycles.

Yet another object is the provision of a plurality of signal lights which indicate the working condition of the apparatus at all times.

Other and further important objects of the invention will be apparent from the disclosures in the accompanying drawings and following specifications.

The invention, in a preferred form, is illustrated in the drawings and hereinafter more fully described.

Figure 1:
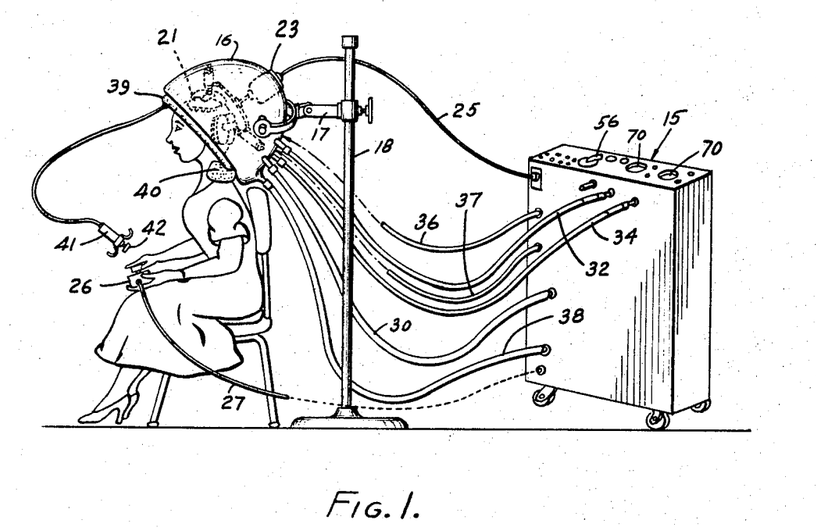
FIGURE 1 is a perspective view of the improved automatic shampooing apparatus of this invention illustrating a few of the essential operating elements.

The reference numeral 15 indicates generally the control combination of the improved automatic shampoo apparatus of this invention, this being connected to a head piece or helmet 16 adapted to be fitted onto the user's head, as best shown in FIGURE 1. This head piece is mounted on an arm 17 secured to a post or support 18, having ball joint or similar connections and also an adjustment for height whereby the same can be readily fitted onto the head of the user for comfortable and convenient operation.

Figure 2:
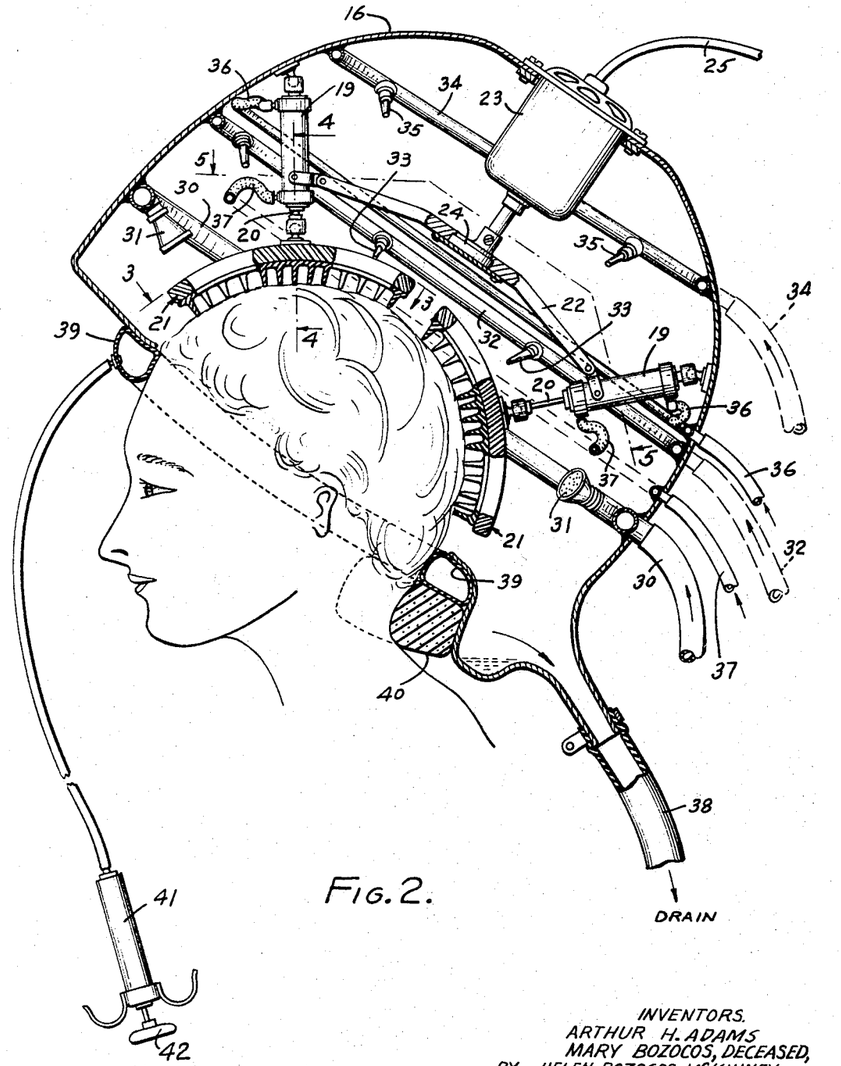
FIGURE 2 is an enlarged detail illustrating the helmet or head piece which is for the purpose of housing and enclosing certain portions of the apparatus which directly wet, soap, massage, rinse, cream or oil and rinse.
Figure 4:
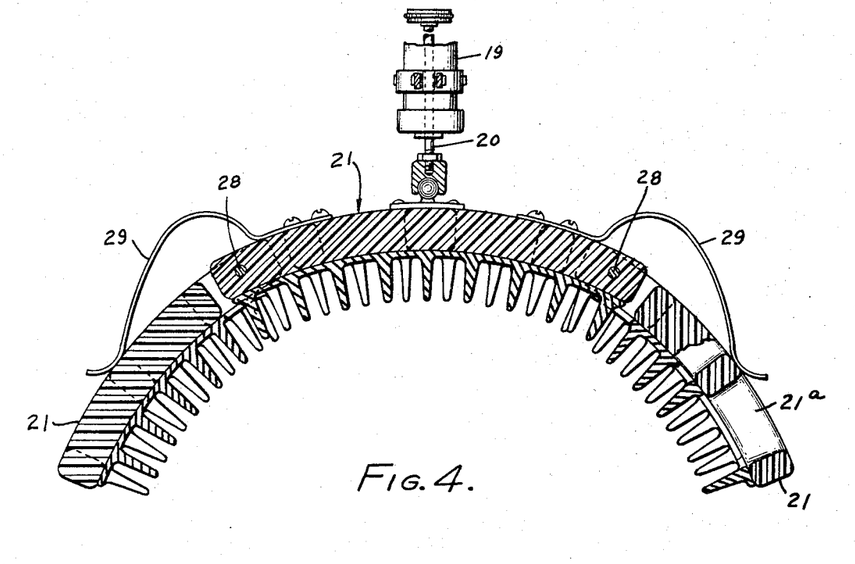
FIGURE 4 is an enlarged section on the plane of the line 4—4 of FIGURE 2, looking in the direction indicated by the arrows.

The head piece or helmet 16 can be composed of any suitable material and has within its frame hydraulic cylinders 19, having plungers 20 connected by ball and socket joints to scrubber elements 21 (FIGURES 2 and 4).

Figure 5:
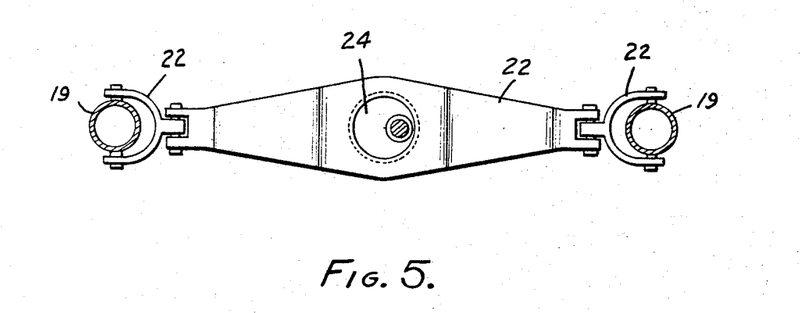
FIGURE 5 is a detail, partly in section, on the broken line 5—5 of FIGURE 2, looking in the direction indicated.
Figure 6:
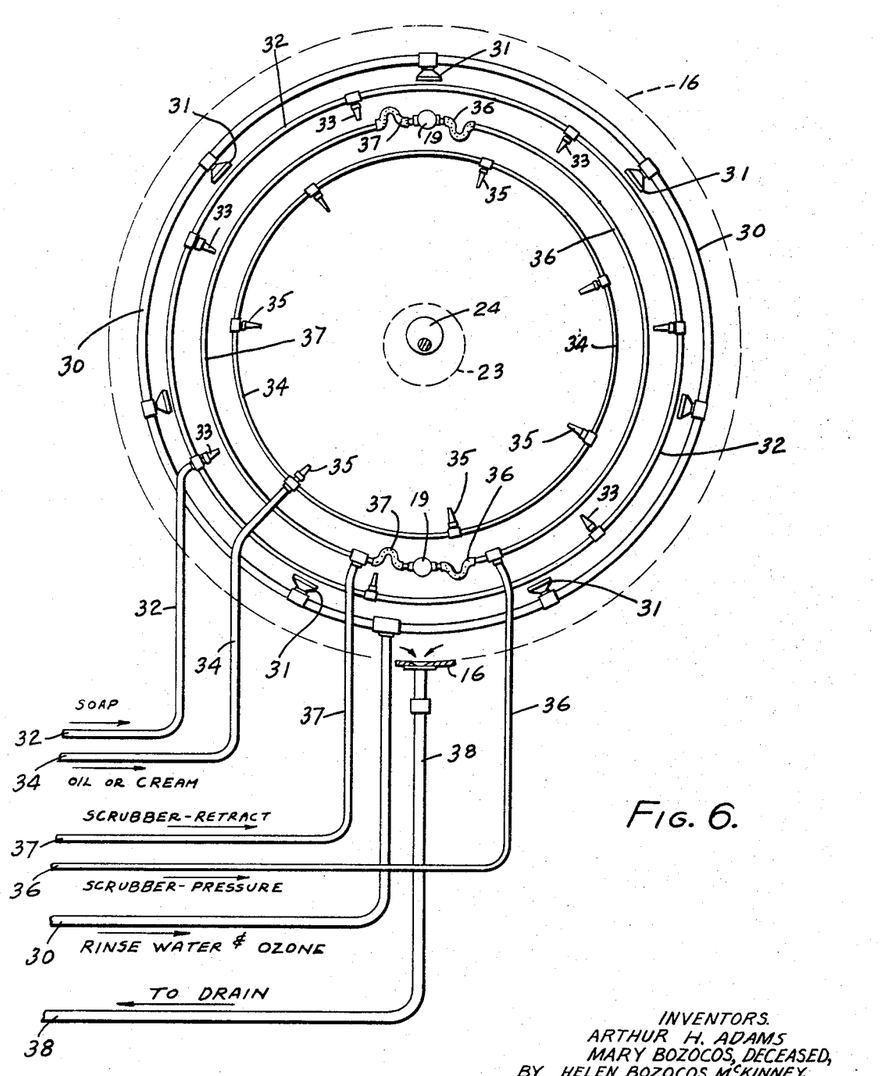
FIGURE 6 is a somewhat diagrammatic view illustrating essential portions of the helmet of FIGURE 2 and showing related operating connections.

The cylinders 19 are connected by links 22 to the shaft of a variable speed motor 23, (FIGURE 2) whereby the scrubber units will move back and forth while being operated by an eccentric 24 on the motor shaft (FIGURE 5).

A wire 25 connects the motor to the control cabinet 15 and the speed of the motor is in turn controlled by the user from a rheostat or similar switch in a housing 26 connected by a wire 27 to the cabinet 15. The control 26 is at all times in the hands of the user, thereby giving the user complete control of this phase of the operation and insuring safety and relaxation. In this manner the scrubbers 21 which are composed of either rubber or plastic or combinations thereof and which are so designed as to conform to minimum, maximum and average contours of human heads will operate in accordance with the user's wishes.

As best shown in FIGURE 4, each scrubber comprises three sections hingedly connected at 28 with the center plate secured to the piston shaft 20 by means of a swivel connection. The end plates are spring loaded as at 29 in order to maintain pressure against the user's head in a direction conforming to the center line of the support axis. In this manner, practically any head contour can be readily accommodated.

Water for rinsing and soaping is supplied to the helmet from a line or conduit 30 and jets 31 placed in strategic positions within the head piece apply water as desired.

Figure 3:
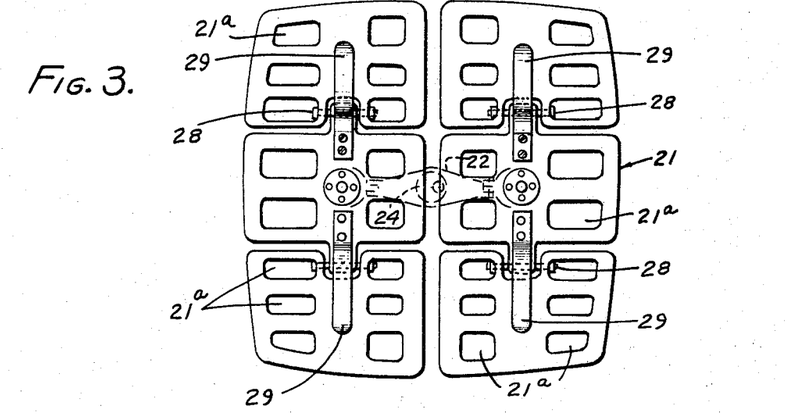
FIGURE 3 is a section on the plane of the curved line 3—3 of FIGURE 2, showing certain details of the scrubbing or massaging element.

From an inspection of FIGURE 3, it will be noted that the scrubbers 21 have openings 21a therein for the purpose of allowing a desired and necessary quantity of water, soap, cream or the like to reach the scalp.

Soap is supplied by a pipe or conduit 32 and jets 33 and oil or cream through a conduit 34 and jets 35. Hydraulic fluid lines 36 and 37 are connected to the cylinders 19 for desired scrubber pressure and retracting operation respectively. These lines are also controlled by the user. A drain pipe 38 leads from the helmet 16.

An inflatable tube 39 is attached to the head piece in such a manner as to conform to the human head above the eyes, behind the ears and continues on around the bottom of the neck near the shoulders, being reinforced by a cushion 40 and adapted to be inflated by means of a hand pump 41 convenient to the patron, all as best shown in FIGURES 1 and 2. This tube 39 will prevent water, soapsuds, oils or the like from escaping from the helmet or head piece end and running down the face or shoulders. A release button 42 is provided on the pump 41 to allow deflation of the tube after completion of the cycle and obviously the pressure in the tube can be maintained by the user to insure non-leakage, while at the same time providing a comfortable fit.

The jets for water can be of any desired number, usually six; and the cream and soap jets are approximately the same number and spaced in strategic positions. The liquid in the cylinders 19 is controlled by four-way solenoid valves operated by position buttons on the control unit 26 in the hands of the user. This remote control switch allows the person using the apparatus to increase or decrease the pressure of the scrubbers on the head or scalp, thereby resulting in a massage which can be gentle or firm as desired.

Sterilization of the head piece can be accomplished by the use of an ozone generator, whereby ozone or oxygen is introduced into the helmet in any convenient or suitable manner, or sterilization can be accomplished by any available means.

The connections for supplying soap, water, oil etc., to the helmet are preferably of clear plastic tubing, but obviously other materials may be employed.

Figure 7:
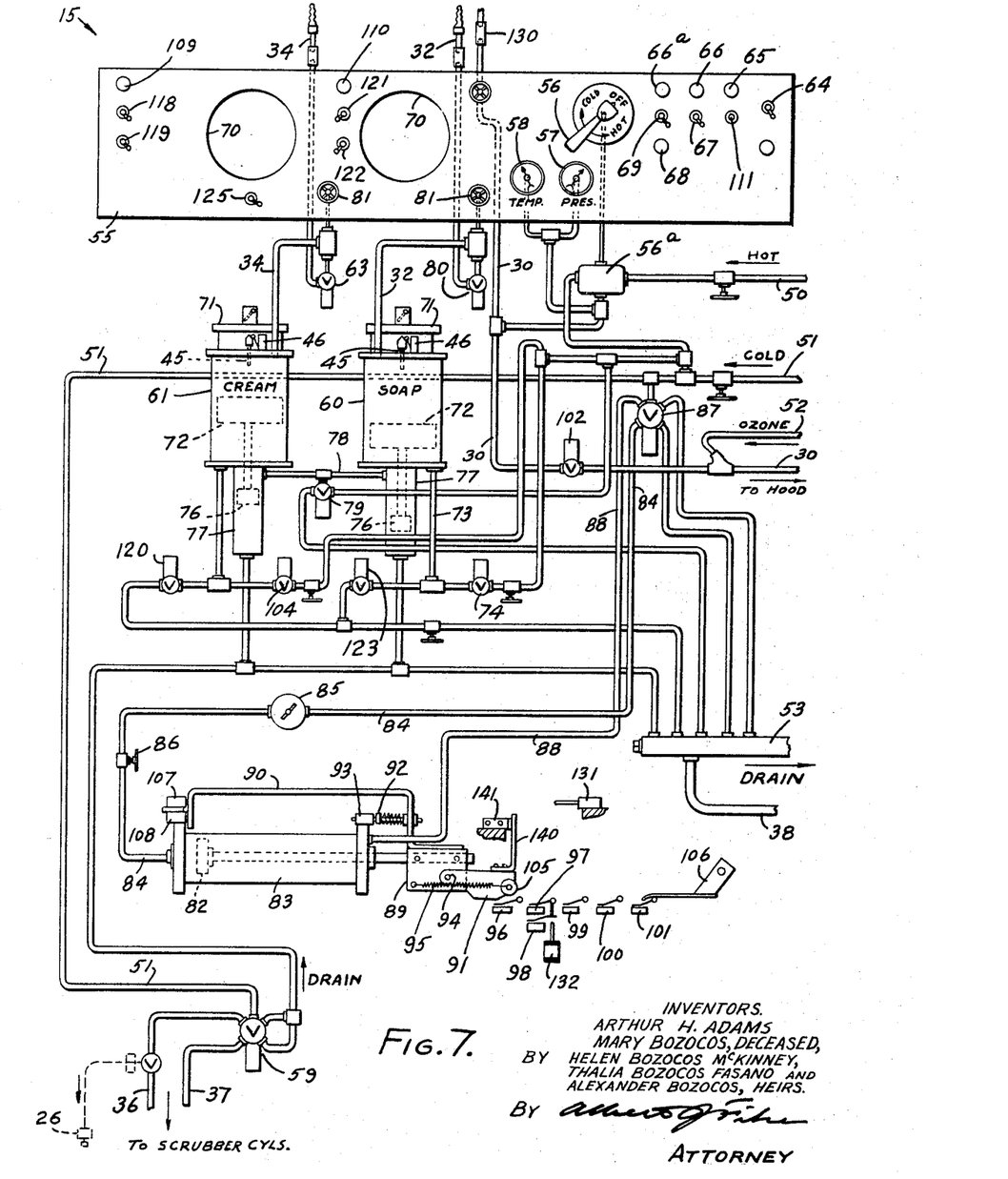
FIGURE 7 is a partly diagrammatic, schematic and detail view of the mechanism and fluid and control lines in the operating combination illustrated at the right of FIGURE 1.
Figure 8:
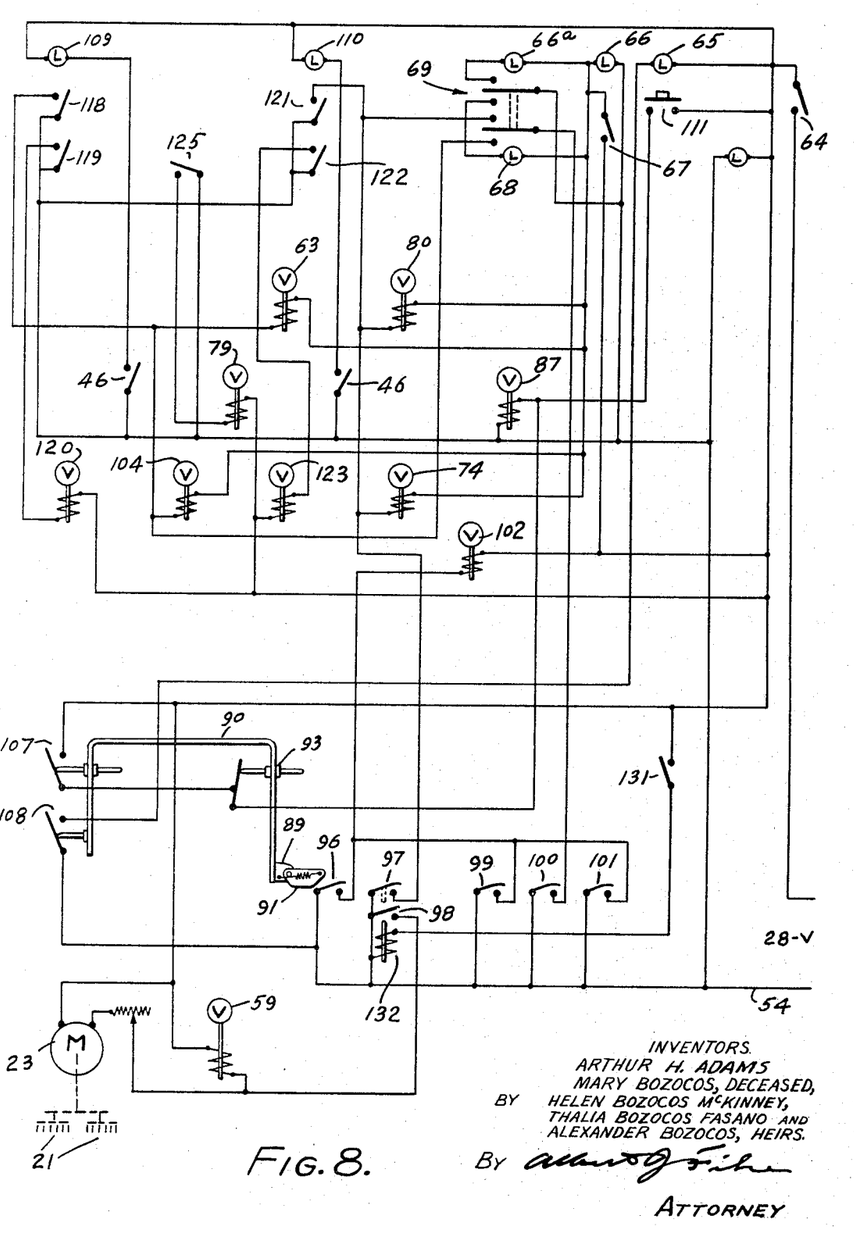
FIGURE 8 is a wiring diagram showing the electrical controls for the mechanism of the improved automatic shampooing, creaming and rinsing apparatus of this invention.

As best shown in FIGURE 7, the cabinet 15 is connected to inlet pipes 50 and 51 for hot and cold water respectively, and inlet pipe 52 for ozone or other sterilizing medium, a drain pipe 53 and as best shown in FIGURE 8, a power input line 54.

The cabinet 15 is provided with a cover 55 (FIGURE 7) which has a valve controlled by a handle 56 for an initial regulation and mixing of the hot and cold water supply; and pressure and temperature gauges 57 and 58 are associated with this control valve. The hot and cold water supply is additionally controlled by a valve 59 which controls the drain pipe from the head piece.

A cylindrical container 60 is provided for soap and a similar container 61 is provided for cream or oil, both being in liquid form; and each of these cylinders has an operating piston 72 therein and solenoid operated valves 80 and 63 respectively in its exit line to control the quantity of soap, cream or oil sent to the helmet or head piece by the connecting lines 32 and 34 respectively.

The panel 55 is also provided with a master switch 64 for current control and an associated signal light 65.

When the light 66 is operated by the switch 67, such action establishes a soap pumping operation. The two-way switch 69 in circuit with the lights 66a and 68 will establish either a soap or oil pumping operation for a second choice through switch 100. It will be noted that the soap switch 67 remains closed throughout the operating cycle.

Figure 9:
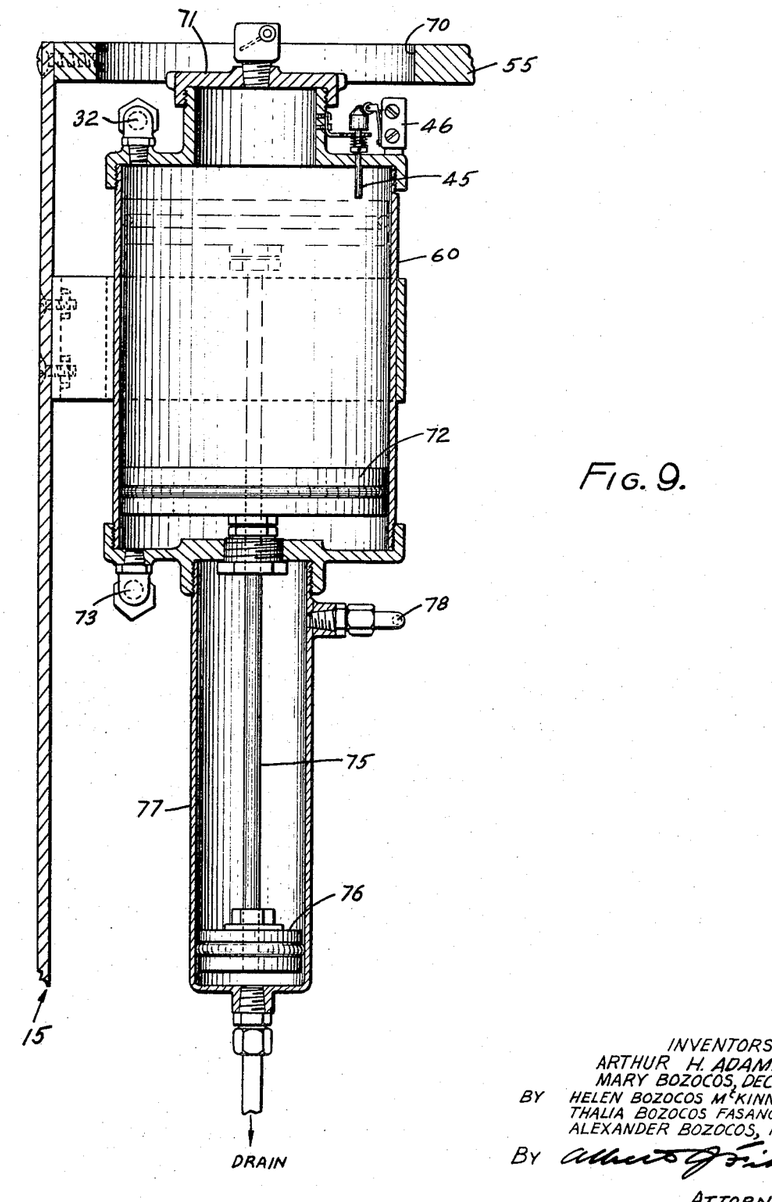
FIGURE 9 is an enlarged sectional detail view of one of the soap or cream containers of the automatic apparatus of this invention.
Figures 10, 11:
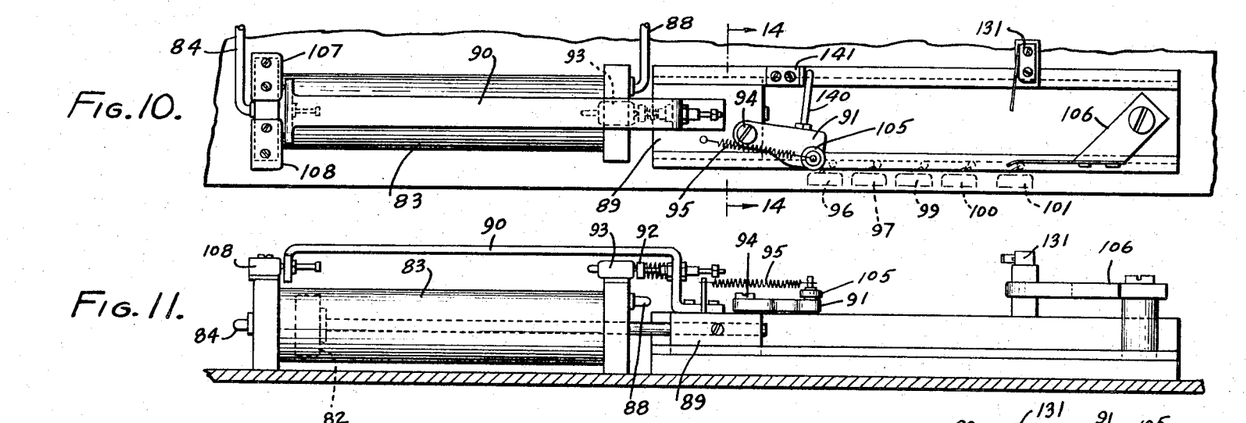
FIGURE 10 is a detail view of the cam controlled switch operated pressure means of the apparatus of this invention viewing the same from the top thereof.
FIGURE 11 is an illustration of the apparatus of FIGURE 10, but showing the same from the side.
Figures 12, 13, 14:
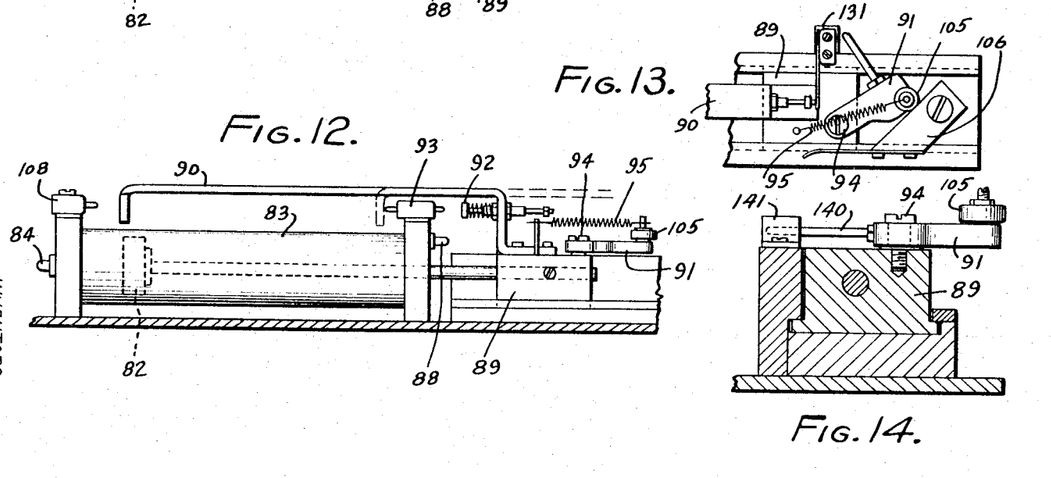
FIGURE 12 is a showing of the mechanism of FIGURES 10 and 11 but in a different operating position.
FIGURE 13 shows the control means of FIGURES 10 and 11 in a different phase of operation and in a different position.
FIGURE 14 is a section on the line 14—14 of FIGURE 10 looking rearwardly.

Openings 70 are in the panel providing ready access to the covers of the soap and cream containing cylinders, one of which is shown in more detail in FIGURE 9. The switches are for the purpose of retracting the pistons in the respective containers for purposes of refilling same after the pistons have moved to an uppermost position in the supplying operation.

Referring now to FIGURE 9, it will be noted that the cylinder 60 has a removable cap 71 for refilling purposes and a piston 72 which moves upwardly to expel soap as required. This piston is moved upwardly by water pressure in a line 73 controlled by a solenoid operated valve 74 (FIGURE 7). A rod 75 connects the piston 72 to another piston 76 in a smaller cylinder 77 fixed beneath the main cylinder 60, and another hydraulic line 78 allows water to enter the cylinder 77 for depressing both pistons when the cylinder 60 is to be refilled. The line 78 is controlled by a solenoid operated valve 79.

When the piston 72 reaches the uppermost limit of its travel, it contacts a position pin 45 in the cylinder cover and this in turn operates a micro-switch 46 which in addition to operating the signal lamp to indicate that a new supply of soap is necessary, also initiates the operation of the valve 79 through its solenoid allowing hydraulic pressure to depress the piston 76 in the cylinder 77, thereby making room for a new supply of soap in the cylinder 60. The cover 71 can then be removed and replenishment accomplished. When this is done the valve 80 (FIGURE 7) is automatically operated by its solenoid assuring an immediate supply of soap to the head piece. Auxiliary hand control valves 81 are also provided for emergencies.

The sequence of operations is automatically accomplished by the action of a piston 82 in a control cylinder 83 (FIGURES 7 and 10 to 12 inclusive). The piston is moved to the right, as shown in these figures by hydraulic pressure from a line 84, having a pressure regulator 85 and a pressure control valve 86 therein. When the operation is started the four-way solenoid operated valve 87 is opened, allowing cold water from the main line 51 to flow through the pipe 84 to the cylinder 83, and at the same time allowing any undesired liquid in the cylinder 83 to escape through the line 88 and valve 87 to drain 53. The movement of the piston 82 is quite slow, as this movement controls the entire operation of wetting, soaping, washing, rinsing, oiling or creaming and final rinsing.

A block 89 is on the end of the rod of the piston 82, and this supports a bracket 90 and a switch operating cam 91. The bracket 90 is fixed on the block 89 and carries a spring pressed terminal 92 which makes contact with a pre-set switch 93 fixed on the cylinder 83 and carrying corresponding current connections as indicated in FIGURE 8.

The switch operating cam 91 is pivoted on the block 89 at 94 and is maintained in position to successively operate a series of switches by a spring 95.

These switches are identified by the reference numerals 96, 97, 98, 99, 100 and 101 (FIGURE 7).

Referring now to FIGURE 8, it will be noted that as the cam 91 moves outwardly by the action of the piston 82 in the cylinder 83, it first closes the switch 96 which through its solenoid operated valve 102 initiates a flow of water through the line 30, this water having been previously mixed to a desired temperature by passage through the control valve 56a.

The switches can be spaced apart so that any desired time interval can be predetermined, but as the block 89 progresses it will necessarily close the switch 97 which opens the valve 80 allowing soap to flow to the helmet through the line 32. The flow of soap is controlled by pressure in the line 73 leading to the container 60, and through the solenoid operated valve 74.

In the meantime the scrubbers 21 are being operated and controlled by the user as heretofore described.

The switch 98 is for the purpose of allowing some sterilizing medium such as ozone or the like to enter the helmet, and this is an optional construction. Obviously, a medium other than ozone can be employed such as any one of the various new chemical products now on the market.

Further movement of the block 89 closes the switch 99 which allows water of the proper temperature to flow to the helmet for rinsing purposes, and this rinse water will be drained off at 38.

Next an application of cream or oil is accomplished by the closing of the switch 100, this opening the valve 104 and allowing the ceram or oil to pass through the tube or pipe 34 to the helmet in a predetermined timed amount. Finally, the switch 101 is closed which again supplies rinse water through the solenoid operated valve 102.

The cam 91 has a roller 105 thereon which as the piston continues towards the end of its travel will ride up on a cam plate 106 moving the cam 91 into a position to open the switch 101, the others having been accordingly opened by spring action after the passage of the cam thereover.

The bracket 90 has simultaneously with the previously described operations moved along with the block 89; and its inner extension will then close the switch 93, the two switches 107 and 108 (FIGURE 8) having been closed at the start of the operation. These switches control signal lights 65, 66 and 68, indicating that the soap and oil supplies are adequate and that the desired operation is progressing satisfactorily.

The pin 45 (FIGURE 9) which is actuated when the piston 72 reaches its upper most limit, will, when closing the switch 46, operate either one of two signal lights 109 and 110 which indicates to the operator that the supply of either oil or soap respectively is exhausted. The containers for soap and oil can then be readily refilled manually by a preliminary operation of the valve 79 which forces the piston down by hydraulic pressure from the water system. The switch 125 operates the valve 79. It will be noted that water pressure through the valves 74 and 104 operates the pistons 72 in soap and oil discharging movements in the cylinders 60 and 61.

The closing of the main switch 64 will, not in itself, provide an actual operation which must be actually instigated by push button 111 in the control panel. The light 65 is associated with this push button and the switch 64 to indicate actual operation. The two-way switch 67 controls respectively the soap and oil supply and pilot lights 66a and 68 are provided adjacent the switches.

The switches 107 and 108 are for the purpose of holding the circuit in operation so long as the switch 93 remains in "on" position.

A visual gauge 130 which provides a water operation and temperature test preliminary to initiation of the shampooing action is provided for the comfort and safety of the user; and after the operator determined that conditions are correct, this can be manually shut off.

A reversing switch 131 is provided for the valve 59 operating through the solenoid 132, and this acts in cooperation with the block 91, pin 140 and stop 141. The cycle adjustment can be made slow or fast, as desired, by means of this construction.

It will be seen that herein is provided an automatic new and useful mechanical unit which will clean, massage, rinse and add cream or oil to the human head and hair in a completely efficient and entirely satisfactory manner and with a high degree of safety dependent practically entirely upon the wishes of the user. In the event of failure of any portion of the apparatus, the operation is immediately either automatically or manually discontinued, whereby even the slightest degree of possible damage is prevented.

The automatic timing hydraulically powered and the bleeding device to assure the necessary supply of soap, cream or oil after refilling, also comprises an important and essential feature.

No water can reach the helmet without being previously automatically brought to the desired temperature and the gauges, besides being at all times visible, are automatically controlled to insure proper pressure of water inside the helmet.

The water, soap, oil, etcetera, are supplied preferably to the head piece by means of plastic, flexible pipes, but other connections may be employed.

I am aware that many changes may be made and numerous details of construction varied throughout a wide range without departing from the principles of this invention, and I, therefore, do not propose limiting the patent granted hereon otherwise than as necessitated by the prior art.

What is claimed is:

1. An automatic shampoo apparatus comprising a helmet adapted to be fitted to the head of the user and having means for securing a fluid tight fit to prevent leakage from the helmet, scrubber means inside the helmet, motor means for actuating the scrubber means, means controllable by the user for regulating the scrubber motor speed, and fluid actuated means controllable by the user for regulating the pressure of the scrubber means upon the user's head, said scrubber means having openings to permit access of fluid to the head of the user, a supply cabinet separate from the helmet adapted to automatically and separately supply water and hair treating fluid to the helmet, said cabinet having a supply vessel therein for hair treating fluid, and having also a water supply therein, separate means connecting said hair treating supply and said water supply to the helmet, separate solenoid actuated valves controlling the flow of water and hair treating fluid from the supply cabinet to the helmet, separate switches for said solenoids, and means automatically actuating said switches comprising a hydraulic cylinder in the cabinet having a piston therein provided with a rod having means for successively engaging said switches as the piston moves lengthwise of the cylinder, and means for supplying hydraulic pressure to said cylinder to actuate said piston.

2. An automatic shampoo apparatus as set forth in claim 1, wherein the scrubber means comprises a plurality of sections movable relative to each other and shaped to conform to the head of the user.

3. An automatic shampoo apparatus as set forth in claim 1, wherein the scrubber means includes a central section and two side sections, each section curved to conform to the shape of the head of the user, and spring means carried by the central section and yieldingly engaging the side sections to urge them into contact with the head of the user.

4. An automatic shampoo apparatus as set forth in claim 1, wherein the supply vessel for hair treating fluid comprises a cylinder having a piston therein, and fluid pressure means for actuating the piston to discharge the hair treating fluid therefrom.

5. An automatic shampoo apparatus as set forth in claim 1, wherein means are provided for regulating the temperature and pressure of the water supplied to the helmet from the supply cabinet.

6. An automatic shampoo apparatus as set forth in claim 1, wherein means are provided for returning the piston and rod to their initial position at the end of the switch operating stroke.

7. In a helmet for an automatic shampoo apparatus the combination comprising: scrubber means inside said helmet, variable speed motor means within said helmet for actuating said scrubber means, and fluid actuated means within said helmet for regulating the pressure of said scrubber means upon the user's head.

8. In an automatic shampoo apparatus, the combination comprising: a helmet adapted to be fitted to the head of a user, scrubber means inside said helmet, motor means within said helmet for actuating said scrubber means, and means controllable by the user for regulating the speed of said motor means.

9. In an automatic shampoo apparatus, the combination comprising: a helmet adapted to be fitted to the head of a user, scrubber means inside said helmet, and fluid actuated means controllable by the user for regulating the pressure of said scrubber means upon the user's head.

10. An automatic shampoo apparatus comprising: a helmet adapted to be fitted to the head of a user, scrubber means inside said helmet, motor means for actuating said scrubber means, means controllable by the user for regulating the speed of said motor means, and fluid actuated means controllable by the user for regulating the pressure of said scrubber means upon the user's head.

11. An automatic shampoo apparatus as set forth in claim 10, wherein said scrubber means includes a plurality of sections movable relative to each other and shaped to conform to the head of the user.

12. An automatic shampoo apparatus as set forth in claim 10, wherein said scrubber means includes a central section and two side sections, each of said sections being curved to conform to the shape of the head of the user, and spring means carried by said central section and yieldingly engaging said side sections to urge them into contact with the head of the user.

13. In an automatic shampoo apparatus, the combination comprising: a helmet adapted to be fitted to the head of a user and having means for securing a fluid tight fit to prevent leakage from said helmet, scrubber means inside said helmet, motor means for actuating said scrubber means, means controllable by the user for regulating the scrubber motor speed, and fluid actuated means controllable by the user for regulating the pressure of said scrubber means upon the user's head, said scrubber means having openings to permit access of fluid to the head of the user.

14. An automatic shampoo apparatus comprising: a supply cabinet for automatically and separately supplying a plurality of fluids to a helmet, said cabinet having a supply means therein for each of said fluids; separate solenoid actuated valves within said cabinet for controlling the flow of each of said fluids from said supply cabinet; separate switches for said solenoids and actuating means for automatically actuating said switches, said actuating means including a hydraulic cylinder in said cabinet having a piston therein provided with a rod having means for successively engaging said switches as said piston moves lengthwise of said cylinder, and means for supplying hydraulic pressure to said cylinder to actuate said piston.

15. An automatic shampoo apparatus as set forth in claim 14, wherein means are provided for returning said piston and said rod to their initial positions at the end of the switch operating stroke.

16. An automatic shampoo apparatus as set forth in claim 14, wherein at least one of said fluid supply means comprises a cylinder having a dispensing piston therein, and fluid pressure means for actuating said dispensing piston to discharge fluid from said cylinder.

17. In an automatic shampoo apparatus, the combination comprising: a helmet adapted to be fitted to the head of a user, a supply cabinet separate from said helmet adapted to automatically and separately supply water and hair treating fluid to the helmet, said cabinet having a supply vessel therein for hair treating fluid, and having also a water supply therein, separate means connecting said hair treating supply and said water supply to the helmet, separate solenoid actuated valves controlling the flow of water and hair treating fluid from the supply cabinet to the helmet, separate switches for said solenoids, and means automatically actuating said switches comprising a hydraulic cylinder in the cabinet having a piston therein provided with a rod having means for successively engaging said switches as the piston moves lengthwise of the cylinder, and means for supplying hydraulic pressure to said cylinder to actuate said piston.

18. An automatic shampoo apparatus comprising: a supply cabinet adapted to automatically and separately supply water and hair treating fluid to a helmet, said cabinet having a supply vessel therein for hair treating fluid, and having also a water supply therein, separate solenoid actuated valves for controlling the flow of water and hair treating fluid from said supply cabinet, separate switches for said solenoids, means for automatically actuating said switches comprising a hydraulic cylinder in the cabinet having a piston therein provided with a rod having means for successively engaging said switches as the piston moves lengthwise of the cylinder, and means for supplying hydraulic pressure to said cylinder to actuate said piston.

19. An automatic shampoo apparatus as set forth in claim 18, wherein the supply vessel for hair treating fluid comprises a cylinder having a piston therein, and fluid pressure means for actuating the piston to discharge the hair treating fluid therefrom.

20. An automatic shampoo apparatus as set forth in claim 18, wherein means are provided for regulating the temperature and pressure of the water supplied to the helmet from the supply cabinet.

21. An automatic shampoo apparatus as set forth in claim 18, wherein means are provided for returning the piston and rod to their initial positions at the end of the switch operating stroke.

References Cited

UNITED STATES PATENTS

| | | | |
|---|---|---|---|
| 2,097,952 | 11/1937 | Lohr. | |
| 2,813,275 | 11/1957 | Davenport. | |
| 3,044,473 | 7/1962 | Cover | 132—9 |
| 3,177,868 | 4/1965 | Wallace et al. | 128—65 |
| 3,224,438 | 12/1965 | Orifici | 128—46 |

LAWRENCE W. TRAPP, *Primary Examiner.*

U.S. Cl. X.R.

4—159